(12) United States Patent
Belimpasakis et al.

(10) Patent No.: US 10,419,583 B2
(45) Date of Patent: Sep. 17, 2019

(54) SYSTEM AND METHOD FOR INITIATING CONTENT STREAMING

(71) Applicant: Bang & Olufsen A/S, Struer (DK)

(72) Inventors: Petros Belimpasakis, Copenhagen (DK); Lyle Bruce Clarke, Lunderskov (DK); Karsten Langhoff Sorensen, Skive (DK)

( * ) Notice: Subject to any disclaimer, the term of this patent is extended or adjusted under 35 U.S.C. 154(b) by 115 days.

(21) Appl. No.: 15/293,228

(22) Filed: Oct. 13, 2016

(65) Prior Publication Data

US 2017/0134452 A1 May 11, 2017

(30) Foreign Application Priority Data

Nov. 10, 2015 (DK) .......................... PA 2015 00708

(51) Int. Cl.
*H04L 29/08* (2006.01)
*H04L 29/06* (2006.01)
*H04L 12/28* (2006.01)

(52) U.S. Cl.
CPC .......... *H04L 67/34* (2013.01); *H04L 12/2803* (2013.01); *H04L 12/2807* (2013.01); *H04L 12/2818* (2013.01); *H04L 29/06319* (2013.01); *H04L 29/06448* (2013.01); *H04L 29/08576* (2013.01); *H04L 65/1069* (2013.01);
(Continued)

(58) Field of Classification Search
CPC ............. H04L 12/2805; H04L 12/2812; H04L 12/282; H04L 12/2827–2829; H04L 12/2838; H04L 29/06319–06326; H04L 29/06448–06517; H04L 29/08576–08585; H04L 65/60; H04L 12/2803–282; H04L 29/06326; H04L 29/08585; H04L 65/1066; H04L 65/1069; H04L 65/4069–608; H04L 67/26;
(Continued)

(56) References Cited

U.S. PATENT DOCUMENTS

| 8,396,925 B2 * | 3/2013 | Yoneda | H04M 1/7253 |
| | | | 709/205 |
| 8,624,728 B2 * | 1/2014 | Karaoguz | H04L 12/2803 |
| | | | 340/12.31 |

(Continued)

OTHER PUBLICATIONS

"SIP: Session Initiation Protocol"; Jun. 2002; http://www.ietf.org/rfc/rfc3261.txt (Year: 2002).*

*Primary Examiner* — Brendan Y Higa
(74) *Attorney, Agent, or Firm* — The Law Offices of Eric W. Peterson

(57) ABSTRACT

A system for streaming content, the system comprising a consumer electronics device, a mobile communication device, and a triggering device, wherein: the consumer electronics device is configured to receive a command signal from a triggering device, receive content identification instructions from the mobile communication device, and receive a streamed content signal from a network; the mobile communication device comprising a mobile application stored in computer storage, the mobile application comprising executable instructions that direct the mobile communications device to receive push notification instructions from the network and to transmit content identification instructions to the consumer electronics device; and the triggering device is configured to transmit the command signal to the consumer electronics device.

21 Claims, 12 Drawing Sheets

(52) U.S. Cl.
CPC ...... *H04L 65/4069* (2013.01); *H04L 65/4084* (2013.01); *H04L 67/1097* (2013.01); *H04L 67/26* (2013.01)

(58) Field of Classification Search
CPC ... H04N 21/40–4104; H04N 21/43615; H04N 21/64
See application file for complete search history.

(56) References Cited

U.S. PATENT DOCUMENTS

| | | | | |
|---|---|---|---|---|
| 9,380,095 | B2* | 6/2016 | Kuang | H04L 65/1083 |
| 9,538,240 | B2* | 1/2017 | Wright | H04H 60/31 |
| 9,654,816 | B2* | 5/2017 | Chevillat | H04N 21/4104 |
| 2004/0117845 | A1* | 6/2004 | Karaoguz | G08B 13/19658 |
| | | | | 725/134 |
| 2004/0203385 | A1* | 10/2004 | Narayanan | H04W 76/12 |
| | | | | 455/41.2 |
| 2004/0210657 | A1* | 10/2004 | Narayanan | H04L 29/06 |
| | | | | 709/227 |
| 2007/0093199 | A1* | 4/2007 | Bowen | H04N 5/782 |
| | | | | 455/3.02 |
| 2009/0064346 | A1* | 3/2009 | Larsson | H04L 63/0807 |
| | | | | 726/29 |
| 2009/0282158 | A1* | 11/2009 | Courtemanche | H04N 21/4384 |
| | | | | 709/231 |
| 2012/0131627 | A1* | 5/2012 | Chittella | H04N 21/2381 |
| | | | | 725/109 |
| 2012/0191790 | A1* | 7/2012 | Abadir | H04L 51/14 |
| | | | | 709/206 |
| 2014/0250480 | A1* | 9/2014 | Koh | H04N 21/4828 |
| | | | | 725/110 |
| 2014/0359140 | A1* | 12/2014 | Shankarraman | H04L 65/1069 |
| | | | | 709/227 |
| 2015/0042892 | A1* | 2/2015 | McRae | H04N 5/4403 |
| | | | | 348/734 |
| 2015/0113667 | A1* | 4/2015 | Li | G06F 21/10 |
| | | | | 726/30 |

* cited by examiner

SYSTEM AND METHOD FOR INITIATING CONTENT STREAMING

CROSS REFERENCE TO RELATED APPLICATION

This application claims priority to Danish Application Number PA 2015 00708, filed on Nov. 10, 2015, which is incorporated herein by reference in its entirety.

TECHNICAL FIELD

The present invention relates generally to the field of streaming of digital content such as music, videos or photos from mobile communication devices, such as smart phones, to consumer electronics devices, such as loudspeakers or TV sets, and more specifically to means configured to initiate such streaming processes.

BACKGROUND

Mobile devices have become the primary interface for browsing & discovering content, via content apps (e.g. music services app) as well as rendering (i.e. "playing") the content. At the same time, multiple technologies have emerged for further streaming/casting the content from mobile devices to consumer electronics devices, such as loudspeakers or TV sets, for rendering the content there, and providing to the user a better experience (e.g. better sound or larger displays). Some examples of those technologies include, but not limited to: Google Cast, Apple AirPlay, Bluetooth, DLNA, Spotify Connect, etc.

No matter which technology is used, the experience is very similar:

- The user selects a content item on his preferred content app, via his mobile device;
- The user is notified via an icon, that compatible rendering devices are available near-by (e.g. smart speakers, TVs, etc.);
- The user presses the button to see a list of the available compatible devices where he can stream/cast to;
- A list of devices becomes visible;
- The user chooses the target device;
- Rendering is transferred to that CE device;

This interaction paradigm functions well when the user initiates the experience from the mobile device. Typically, this paradigm is also agnostic of the app used (i.e. it works with any content app).

However, sometimes the user might want to initiate the experience without having to pick up his mobile device. The problem with all prior art streaming/casting experiences is that they have been designed for user interaction via a smart device.

Thus, according to prior art, the mobile device becomes "mandatory" for the content initiation interaction, and thus users cannot have more "lean-back" experiences, of initiating the content (e.g. music) without the need of the smart device to be in reach.

With reference to FIG. 1 there is illustrated a prior art streaming system establishing communication between a cloud service and a consumer electronics device via a mobile device. In the prior art system the mobile device 3 communicates with one or more cloud services 5 as indicated by arrow 6. A streaming of a desired content available in the cloud service is in the prior art system initiated (triggered) from the mobile device 3, and when the cloud service has received information from the mobile device 3 about the content to be streamed and the consumer electronics device 2 to which the streaming is to take place, the streaming is carried out as indicated by arrow 4 and the consumer electronics device 2 renders the requested content.

SUMMARY

A first aspect of the invention relates to a system for streaming content, the system comprising a consumer electronics device, a mobile communication device, and a triggering device, wherein: the consumer electronics device is configured to receive a command signal from a triggering device, receive content identification instructions from the mobile communication device, and receive a streamed content signal from a network; the mobile communication device comprising a mobile application stored in computer storage, the mobile application comprising executable instructions that direct the mobile communications device to receive push notification instructions from the network and to transmit content identification instructions to the consumer electronics device; and the triggering device is configured to transmit the command signal to the consumer electronics device.

The system may have multiple consumer electronics device, mobile communication devices, and triggering devices. The triggering device may be a separate device from the mobile communication device and consumer electronics device.

The consumer electronics device can be any device, such as a loudspeaker, TV set, or the like, configured to output media, such as on the basis of received signals. Media can be audio, video, images, photographs, or the like. The consumer electronics device may be passive where it converts a received signal into a sound. The consumer electronics device may be active and comprise elements, such as an amplifier, filter, delay circuit, or the like, configured to alter a received signal before outputting a sound corresponding to the altered signal. The alteration may be an amplification, conversion, filtering, delay, or the like.

The consumer electronics device can have a user interface configured to receive instructions, such as from a user, by way of a keyboard, keypad, touch pad, microphone, movement sensor, gesture sensor, camera, or the like. The user interface can have a display/monitor of any type (LED, LCD, OLED, Plasma, CRT, or the like) and/or sound generators, such as speakers.

The mobile communication device can be a wireless device being battery powered and adapted to perform wireless communication. The mobile communication device can be a pad computer, such as an iPad, or a smartphone, such as an iPhone. The mobile communication device may be a personal computer, such as a lap top, an electronic reader, an iPod Touch, or the like. The mobile communication device can have a user interface configured to receive instructions, such as from a user, by way of a keyboard, keypad, touch pad, microphone, movement sensor, gesture sensor, camera, or the like. The user interface can have a display/monitor of any type (LED, LCD, OLED, Plasma, CRT, or the like) and/or sound generators, such as speakers.

The mobile communication device can have a processor configured to determine the content to be streamed/played. The processor can be an FPGA, ASIC, microchip, hardwired circuit, software controlled processor, DSP, or the like, which can be a monolithic unit or a distributed system.

Triggering device can be a remote control, or the like. The triggering device can have a push button device, a timer device, a voice activation device, a movement sensor, or a proximity sensor.

The triggering device can have a user interface configured to receive instructions, such as from a user, by way of a keyboard, keypad, touch pad, microphone, movement sensor, gesture sensor, camera, or the like. The user interface can have a display/monitor of any type (LED, LCD, OLED, Plasma, CRT, or the like) and/or sound generators, such as speakers.

The consumer electronics device is configured to receive the command signal, such as from a triggering device. The command signal renders the consumer electronics device able to transmit consumer electronics device information to the network. The consumer electronics device information can be any information related to a consumer electronics device, such as, serial number, local IP address, means in which the trigger was initiated, credentials, or the like.

The consumer electronics device is configured to receive content identification instructions from the mobile communication device. The content identification instructions render the consumer electronics device able to transmit content request instructions to the network. The content identification instructions can have content information, such as media information, or the like.

The content information can be actual media information or part of media information, and/or information identifying or pointing to a location where the media information can be obtained. The content information can be account information or the like for accessing the media information. The content information can be associated with information on the internet, for example, a URL (Uniform Resource Locator) to the media information, or a file location on the internet, a local network, a media store, or the like.

The consumer electronics device is configured to transmit consumer electronics device instructions to the network. The consumer electronics device instructions can render the network able to determine the user associated with the consumer electronic device.

The consumer electronics device is configured to receive a streamed content signal from a network. The content signal renders the consumer electronics device able to provide content. The content signal may be a signal configured to be directly converted into sound or an image. The providing of the content can be playing of a song or movie, displaying images or pictures, or the like.

The network is preferably a cloud service or cloud computing service, the network can be any type of source, such as local media server, remote server, internet, streamed from the radio, wireless, or internet, a local storage, hard drive, DVD drive, or the like. The network can be configured to receive content request instructions from the consumer electronics device, receive consumer electronics device instructions from the consumer electronics device, and transmit a streamed content signal to the consumer electronics device.

The mobile communication device is configured to receive push notification instructions from the network. The push notification instructions render the mobile communication device able to identify content information which can be transmitted to the consumer electronics device. The push notification instructions can have notification information, such as information related to the consumer electronics device via which the trigger was received, serial number, local IP address, or the like. The mobile communication device is configured to transmit content identification instructions to the consumer electronics device.

The mobile application is configured to receive push notification instructions from the network. The mobile application is configured to transmit content identification instructions to the consumer electronics device. As used herein, the mobile application may be referred to as a software application or content "App."

The consumer electronics device, a mobile communication device, and a triggering device can have receivers and/or transmitters. The receivers can be configured to receive instructions from the corresponding device, such as the mobile communication device, and thus allows a user to enter instructions into the corresponding device. The transmitters can be configured to transmit instructions from the corresponding device, such as the mobile communication device, and thus allows a user to send instructions from the corresponding device. The receivers and/or transmitters, and the devices corresponding thereto, can be configured to communicate over a wired connection or over a wireless connection, such as via Ethernet, LAN, WAN, Bluetooth, WiFi, IR communication, or the like.

In one embodiment, the consumer electronics device is configured to transmit content request instructions to the network. The content request instructions render the network able to provide content to the consumer electronics device. The content request instructions can have content information.

In one embodiment, the mobile communication device further comprises a second mobile application stored in computer storage, the second mobile application comprising executable instructions that direct the mobile communications device to receive push notification instructions from the network and transmit content identification instructions to the consumer electronics device, wherein the mobile application and the second mobile application are configured to transmit the content identification instructions where authorization to transmit the content identification instructions is granted by the mobile communication device. The second mobile application can be configured to receive push notification instructions from the network. The second mobile application can be configured to transmit content identification instructions to the consumer electronics device.

In one embodiment, the network is configured to determine the user that is associated with the consumer electronics device. The network can determine the associated user by identifying the mobile communication device, the mobile application, or the like, that is associated with the consumer electronics device.

In one embodiment, a second triggering device is configured to transmit a second command signal to a second consumer electronics device, wherein the mobile communication device is configured to determine which of the consumer electronics devices will provide content, wherein upon the transmission of the second command signal, the first consumer electronics device is providing content. In this embodiment, a first consumer electronics device is providing content and a second triggering device transmits a second command signal to a second consumer electronics device. Second push notification instructions can be received by the mobile application device rendering the mobile application device able to determine which of the consumer electronics device will provide content. The mobile application device or the mobile application can be configured to instruct the first consumer electronics device to provide content, the second consumer electronics device to provide content, or both the first and the second consumer electronics devices to provide content.

In one embodiment, the triggering device is configured to transmit the command signal and/or second command signal to the mobile communication device. The command signal renders the mobile communication device able to transmit consumer electronics device information to the network.

Another aspect of the invention relates to a method for streaming content, the method comprising:
  by a consumer electronics device: receiving a command signal from a triggering device, receiving content identification instructions from the mobile communication device, and receiving a streamed content signal from a network;
  by execution of a mobile application on a mobile communication device: receiving push notification instructions from a network and transmitting content identification instructions to the consumer electronics device; and
  by a triggering device: transmitting the command signal to the consumer electronics device.

In one embodiment, the method comprising, by the consumer electronics device, transmitting content request instructions to the network.

In one embodiment, the method comprises, by execution of the second mobile application on the mobile communication device, receiving the push notification instructions from the network and transmitting the content identification instructions to the consumer electronics device, and by execution of the mobile application or the second mobile application, transmitting the content identification instructions wherein authorization to transmit the content identification instructions is granted by the mobile communication device.

In one embodiment, the method comprises, by the mobile communication device, determining the user that is associated with the consumer electronics device.

In one embodiment, the method comprises, by a second triggering device, transmitting a second command signal to a second consumer electronics device, and by the mobile communication device, determining which of the consumer electronics devices will provide content, wherein upon transmitting the second command signal, by the first consumer electronics device, providing content.

In one embodiment, the method comprises, by the triggering device, transmitting the command signal to the mobile communication device.

In one embodiment, the method comprises, by the triggering device transmitting the command signal via Bluetooth technology.

On the above background it is an object of the present invention to provide flexible means for initiating streaming/casting experiences that a user can operate without the need to have direct access to his or her mobile device.

This and other objects and advantages are obtained with the method and system according to the present invention.

According to the invention there is provided a method and a system for initiating streaming/casting experiences from external triggers, with the use of remote notifications to content apps provided in or accessible from a mobile device such as a smart phone.

According to the invention a user or an event can trigger (e.g. by pressing a button on a product, such as a consumer electronics device, by activating a remote control, by activation via a timer, by registering the occurrence of a predefined event, etc.) an experience in such a way that the trigger (a trigger signal) is then provided to the mobile device (e.g. via a cloud push notification), which instructs it to start the relevant content app (e.g. music service app), and initiate a content streaming/casting experience from the mobile app to the relevant consumer electronics device (e.g. the device who's button was pressed).

According to the principles of the invention, while the standard streaming/casting technologies can be used (without any modifications), the desired "lean-back" experience is delivered, by enhancing only the content app with a method of receiving notifications from a triggering device and appropriately initiating the streaming/casting experience to the CE device of relevance.

According to a first aspect of the invention there is provided a method for initiating streaming or casting experiences from one or more consumer electronics devices, such as loudspeakers or TV sets, the method comprising:
  providing one or more consumer electronics devices configured to be able to perform streaming or casting experiences upon reception of a command signal;
  providing a mobile communication device, such as a smart phone, configured to receive a push notification signal from a cloud service and to transmit a content identification signal to said one or more consumer electronics devices upon reception of the push notification signal;
  providing a triggering device external to said mobile communication device and configured to provide said command signal when the triggering device is being activated.
whereby said one or more consumer electronics devices will render said streaming or casting experiences upon activation of said triggering device.

In an embodiment of the first aspect the triggering device provides the triggering signal directly to the one or more consumer electronics devices.

In an embodiment of the first aspect the mobile device is provided with a content app, which content app that is configured for receiving a push notification from a push notification gateway associated with said cloud service, such that said content app, upon reception of said push notification, performs a streaming/casting experience to provide said content to said consumer electronics device(s).

In an embodiment of the first aspect the triggering signal is generated in and transmitted from a remote control device.

In an embodiment of the first aspect the triggering device comprises at least one of the following group of triggering signal generating devices: a user actuated means such as a push button, a timer, a voice activation device, or a movement or proximity sensor device.

Any streaming/casting technology can be used in the invention, such as: Google Cast, AirPlay, DLNA, Bluetooth etc.

In an embodiment of the first aspect of invention, the triggering (e.g. from the remote control) is not delivered to the CE-device, but it is delivered to the mobile device or content app directly. For example, that triggering could be based on a Bluetooth low energy triggering.

In an embodiment of the first aspect of the invention, the triggering is not performed by a physical action (e.g. button press), but by some other trigger. For example, an alternative trigger could be an alarm based on time (where the user requested that music should start playing at 08:00 am).

In an embodiment of the first aspect of the invention, a sensor for instance configured to sense a user approaching the CE product, or a user approaching or entering a location/geographical area is used to trigger the system or method according to the invention.

In an embodiment of the first aspect of the invention, the content could be photos, videos (played to TV), or any other type of content.

In an embodiment of the first aspect of the invention, the content app is not running on a traditional personal mobile device (smartphone/tablet), but on a dedicated in-home static device (e.g. PC or other embedded device)

In an embodiment of the first aspect of the invention, the content app might not be able to receive remote push notifications. In this case, a secondary app or a "dedicated push notification receiver") is running on the same mobile device, as the content app. This dedicated push notification receiver app is designed to receive remote push notifications, from the cloud service, and then execute the launch on the content app on the mobile device (within the same device). The streaming/casting action could be executed by either, depending on which of those apps has the capabilities and the permissions by the operating system and the streaming/casting SDK.

In an embodiment of the first aspect of the invention, the user might have multiple mobile devices (e.g. smartphone and tablet) linked to his account. The system according to the invention is in this embodiment able to choose the device to execute the method based on different parameters (e.g. which device is turned on, or which device is in the home network).

In practice, a user might have multiple CE-devices. Based on pre-defined settings and context parameters, the system would be able to decide what is the best action to perform, when a trigger is initiated at a second device, while an on-going streaming/casting experience is taking place at the first device. For example, the system might "expand" the same experience and play the same content in the two devices (in a "multi-room" mode, where same content is played in a synchronized/echoless manner). Or, the system might decide to initiate a totally stream/cast a different experience (e.g. another song or radio station).

Thus, in an embodiment of the first aspect of the invention, the method comprises the provision of a plurality of consumer electronics devices, one of which devices is already rendering a streaming or casting experience, where the method comprises the step of, when receiving a new triggering signal at another of said plurality of consumer electronics devices, deciding how the reception of the new triggering signal which of said one or more consumer electronics devices should render the content associated with the new triggering signal.

According to a second aspect of the invention there is provided a system for initiating streaming or casting experiences from one or more external triggers, the system comprising:
one or more consumer electronics devices configured to be able to perform streaming or casting experiences upon reception of a command signal;
a mobile communication device configured to receive a push notification signal from a cloud service and to transmit a content identification signal to said one or more consumer electronics devices upon reception of the push notification signal;
a triggering device provided external to said mobile communication device and configured to provide said command signal when the triggering device is being activated.

BRIEF DESCRIPTION OF THE DRAWINGS

Further benefits and advantages of the present invention will become apparent after reading the detailed description of non-limiting exemplary embodiments of the invention in conjunction with the accompanying drawings, wherein.

DETAILED DESCRIPTION

In the following a detailed description of an example embodiment of the invention is given. It is, however understood that the principles of the invention could be embodied in other ways.

Figure 1:
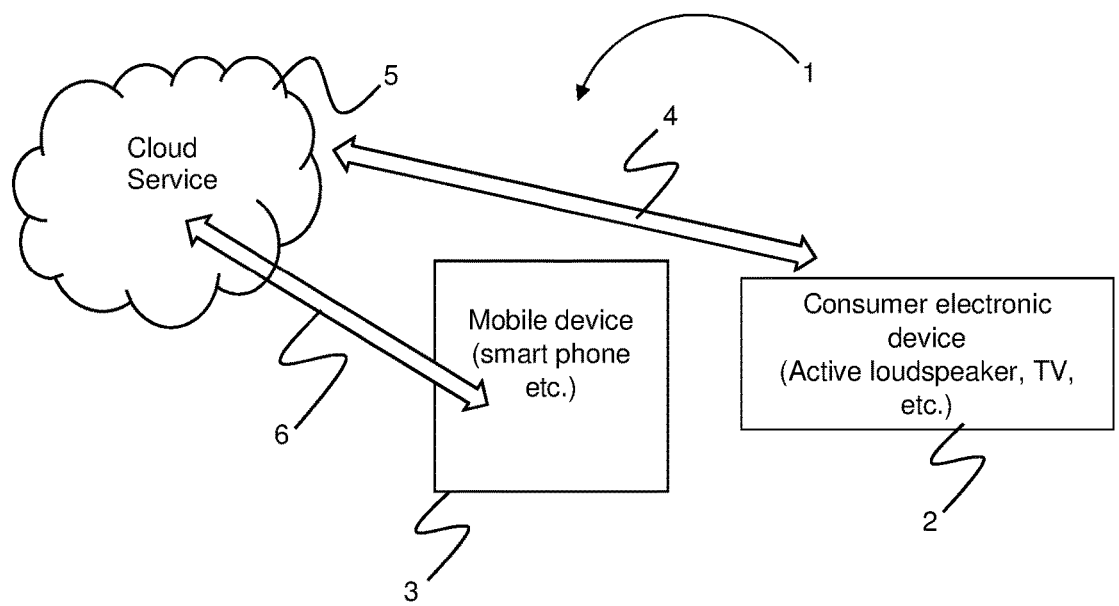
FIG. 1 shows a prior art streaming system establishing communication between a cloud service and a consumer electronics device via a mobile device.

With reference to FIG. 1 there is illustrated a prior art streaming system establishing communication between a cloud service and a consumer electronics device via a mobile device. In the prior art system the mobile device 3 communicates with one or more cloud services 5 as indicated by arrow 6. A streaming of a desired content available in the cloud service is in the prior art system initiated (triggered) from the mobile device 3, and when the cloud service has received information about the content to be streamed and the consumer electronics device 2 to which the streaming is to take place, the streaming is carried out as indicated by arrow 4 and the consumer electronics device 2 renders the requested content.

Figure 2:
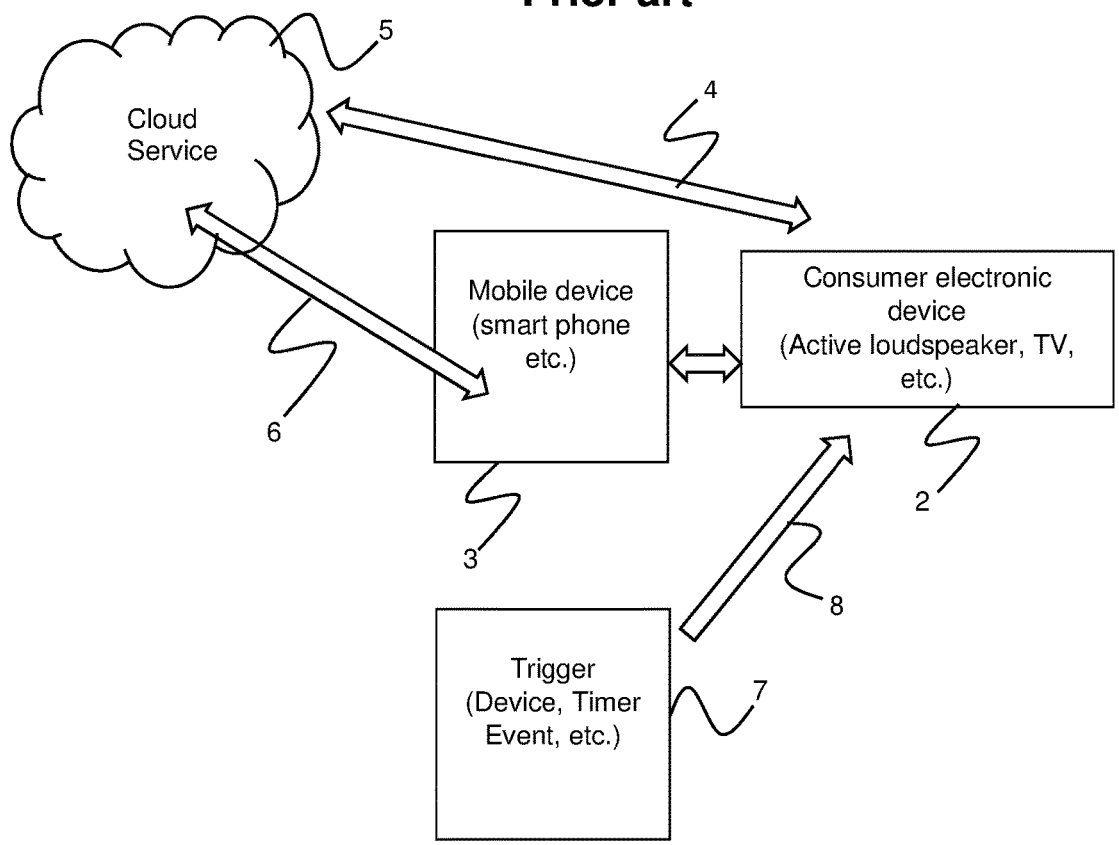
FIG. 2 shows an illustration of the basic principle of the present invention.

With reference to FIG. 2 there is shown an illustration of the basic principle of the present invention. According to the invention the request for streaming of a specific content from a cloud service 5 to a consumer electronics device 2 is not initiated from the mobile device 3 but from a triggering device 7, for instance a remote control, to the consumer electronics device 2 as indicated by arrow 8. An example embodiment of the procedure carried out after a triggering signal has been elicited from the triggering device 7 and until the desired content is actually rendered via the consumer electronics device 2 is described in the following.

With reference to FIGS. 3 through 12 there is described a main scenario applying the principles of the invention, which description and the associated figures constitute a non-limiting example of an embodiment of the present invention. FIGS. 3 to 12 describes initiating a streaming/casting experience, from a trigger device that is configured to interact with a consumer electronics (CE) device. As an example, the trigger device could be a remote control and the consumer device could be a loudspeaker device that can be remote controlled from the remote control. It is however understood that numerous other devices could also be configured to be compatible with the principles of the present invention.

Figure 3:
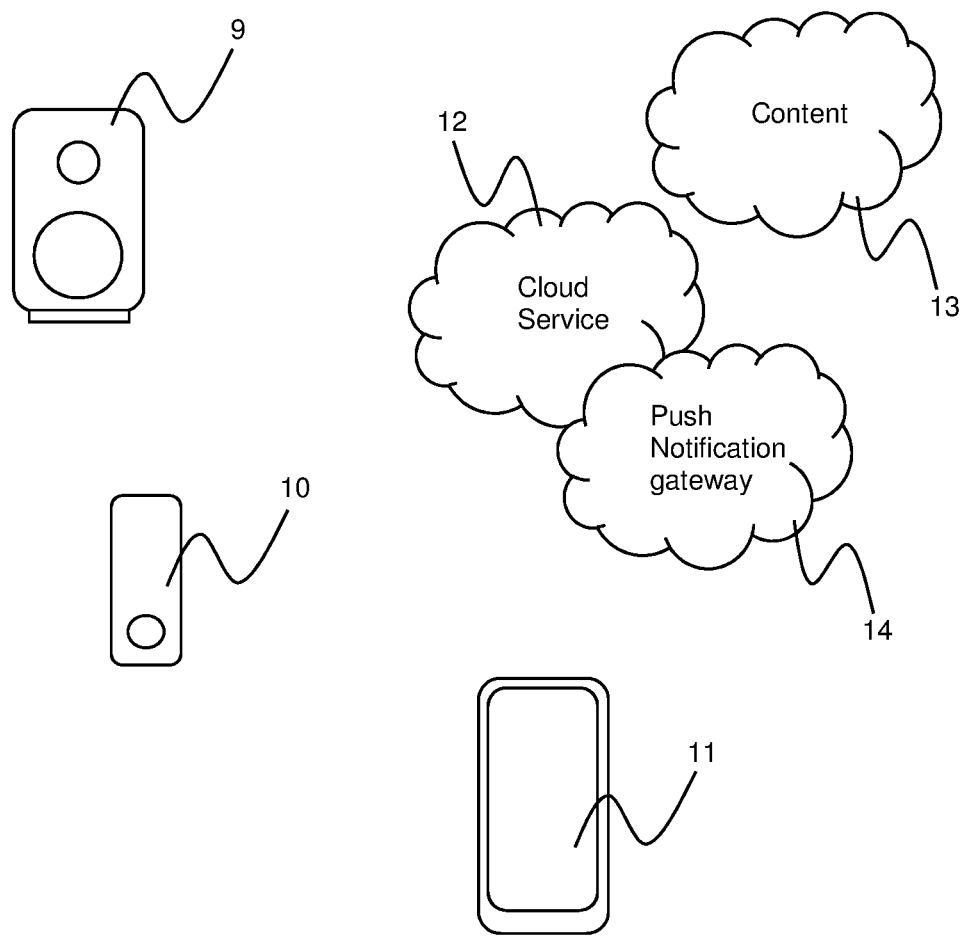
FIG. 3 shows a scenario comprising a consumer electronics device consisting of a loudspeaker device, a mobile device, for instance a smart phone and a remote control, which scenario provides an example embodiment of the present invention.
Figure 9:
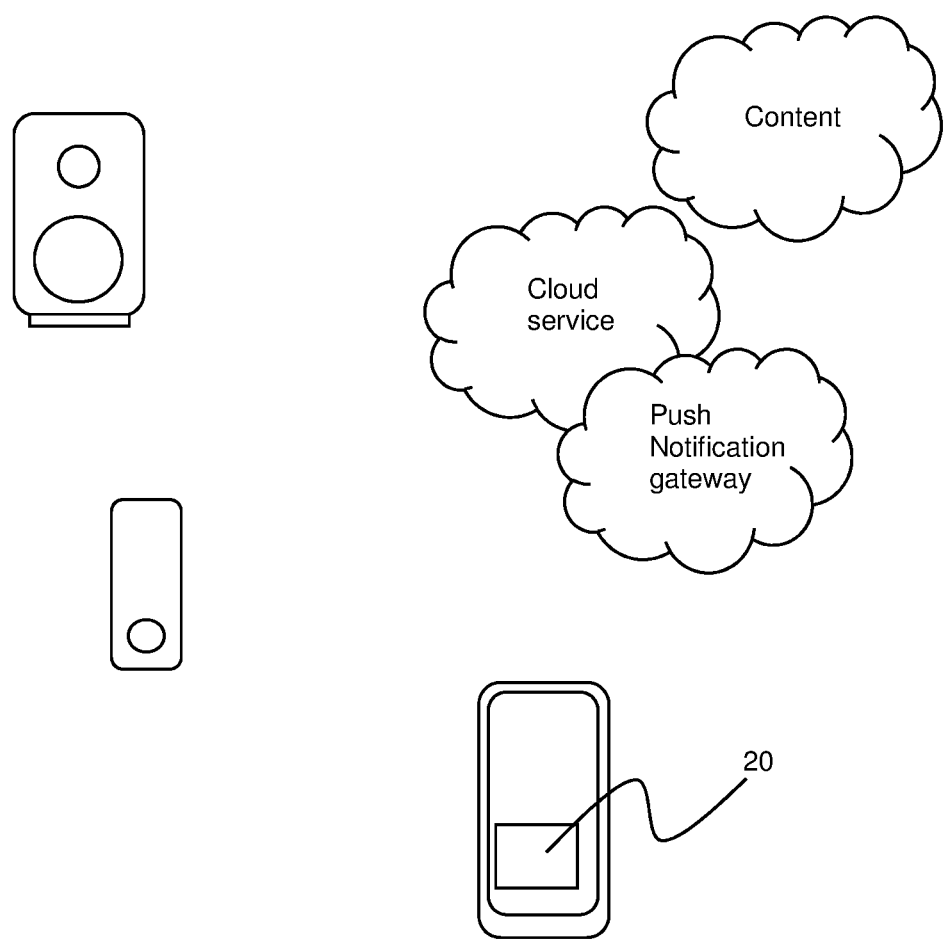
FIG. 9 shows the content app performing its background execution, which could include a process of identifying what content needs to be played (e.g. should it be Internet Radio, or music from a music service, etc.)

With reference to FIG. 3, a user has a mobile device 11 that is loaded with a content app (e.g. a music service app) (reference numeral 20 in FIG. 9). The user further has a CE-product in his home network, which CE-product in this example is a loudspeaker device 9, and both of these devices (CE-product and mobile device) support a standard streaming/casting technology (e.g. Google Cast in this case). It is assumed that there has been, via a cloud service, a "prepairing" of the product and the app (i.e. the cloud service knows that this product belongs to a specific customer, and there is a mapping between the product and the instance of the content app). This could be via an on-line account where the customer has registered his products and mobile apps.

Figure 4:
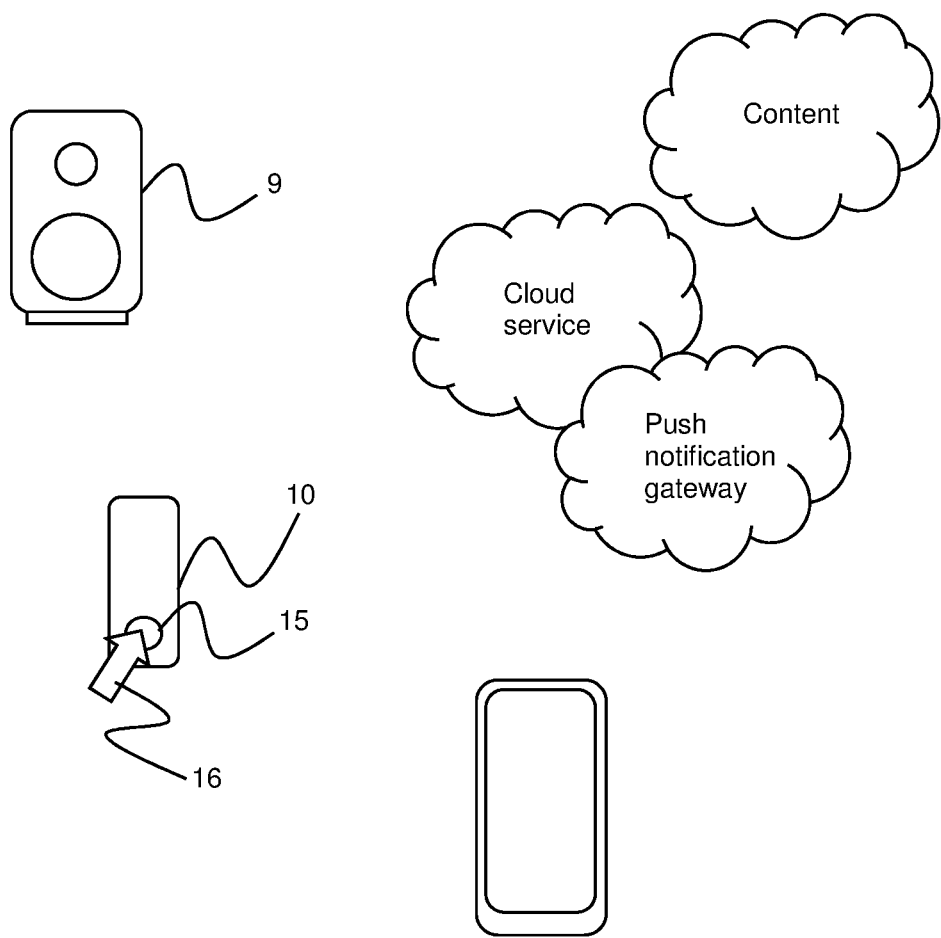
FIG. 4 shows a user initiating a trigger that in the embodiment shown in FIG. 3 takes place by pressing a button on a remote control.
Figure 5:
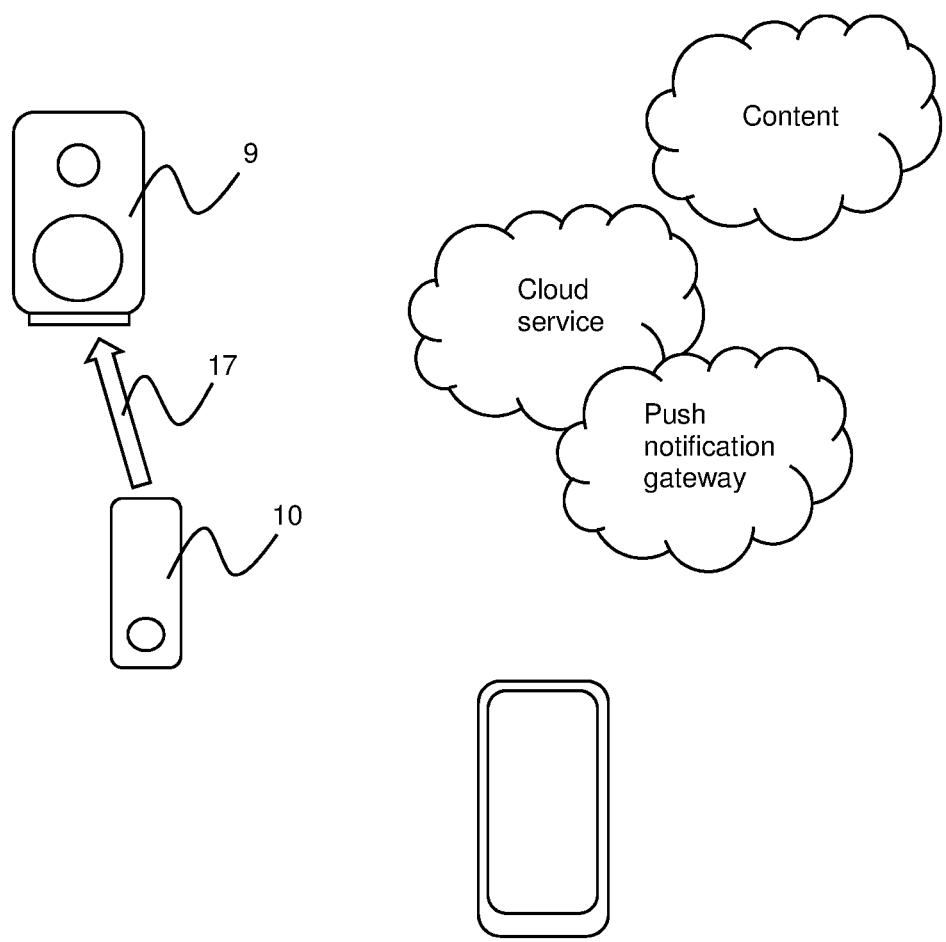
FIG. 5 shows a command signal being passed from the remote control to the loudspeaker in the embodiment shown in FIG. 3.

With reference to FIG. 4, the user is initiating a trigger that in the present example takes place by pressing (indicated by arrow 16) a button 15 on a remote control 10 that is associated with the CE product 9, for initiating a content experience (e.g. starting the music). The triggering releases a command signal 17 (c.f. FIG. 5) from the remote control to the CE product.

With reference to FIG. 5, the command signal 17 is passed to the CE product 9. The command 17 could be a Bluetooth command, or an infrared command, etc. Alternatively, the command could be released directly on the product via a suitable user interface provides on the CE product without the use of a remote control.

Figure 6:
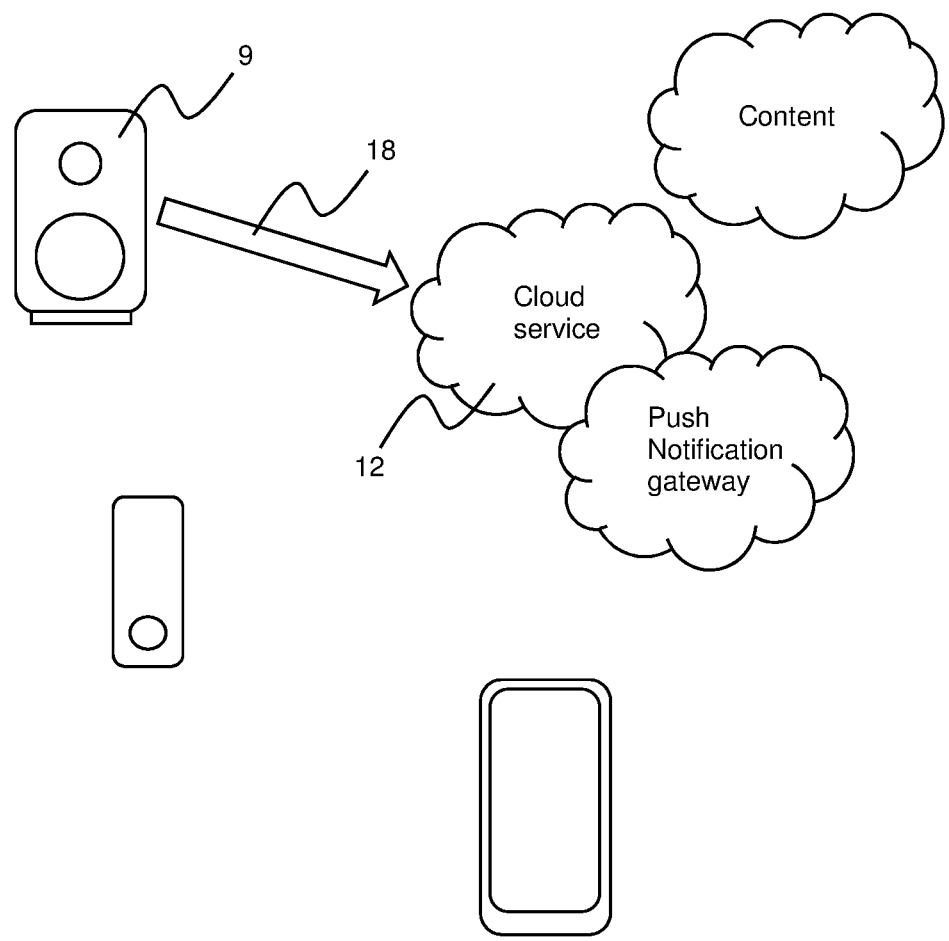
FIG. 6 shows the loudspeaker contacting the cloud service in the embodiment shown in FIG. 3.

With reference to FIG. 6, the CE-device 9 contacts the cloud service 12 as shown by reference numeral 18, where the mapping between devices and mobile device/app exists. In this scenario, it is assumed that the product is connected to a WiFi network in the user's home, and initiates this communication over IP. The cloud service could be, for example, hosted by the CE-manufacturer or the content app provider. As parameters to the cloud service 12, the product 9 could pass information such as its serial number, the local IP address, how the trigger was initiated, credentials, and/or other parameters.

Figure 7:
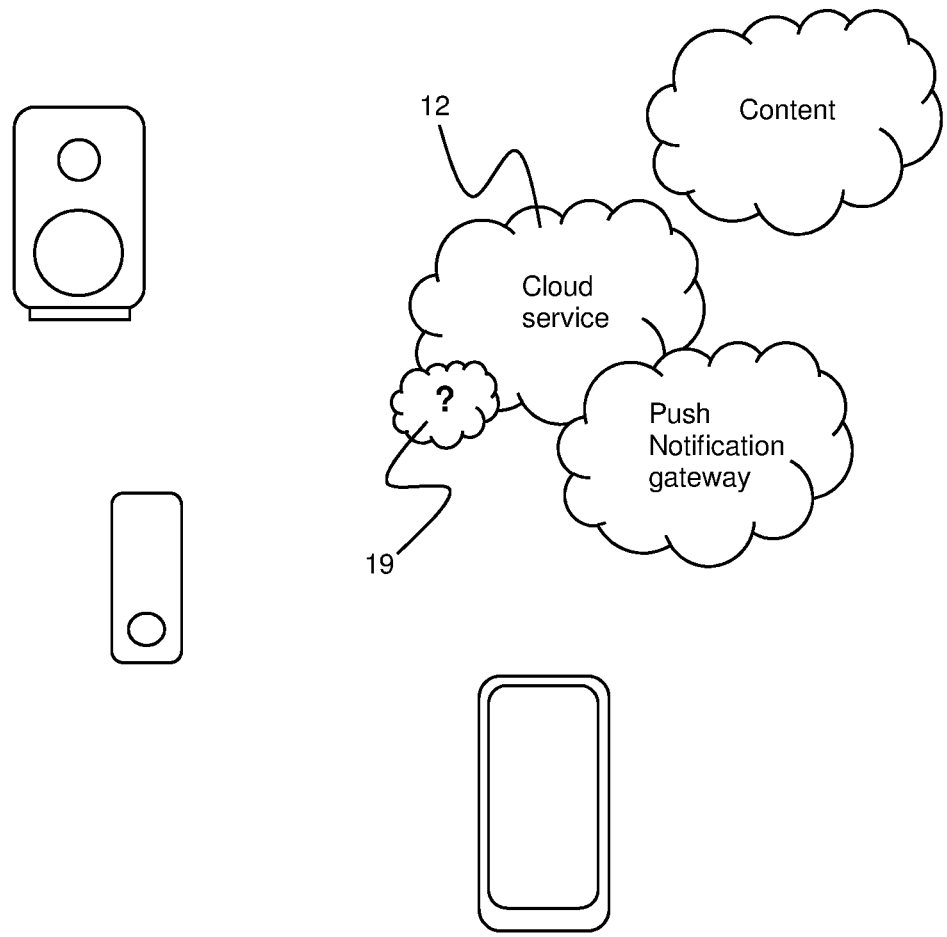
FIG. 7 shows the cloud service performing a look-up/matching activity to determine the user to whom the loudspeaker belongs, and which instance of the content app has been paired to this loudspeaker.

With reference to FIG. 7, the cloud service 12 is performing a look-up/matching activity 19, to determine the user to whom the product 9 belongs, and which instance of content app 20 has been paired to this product 9.

Figure 8:
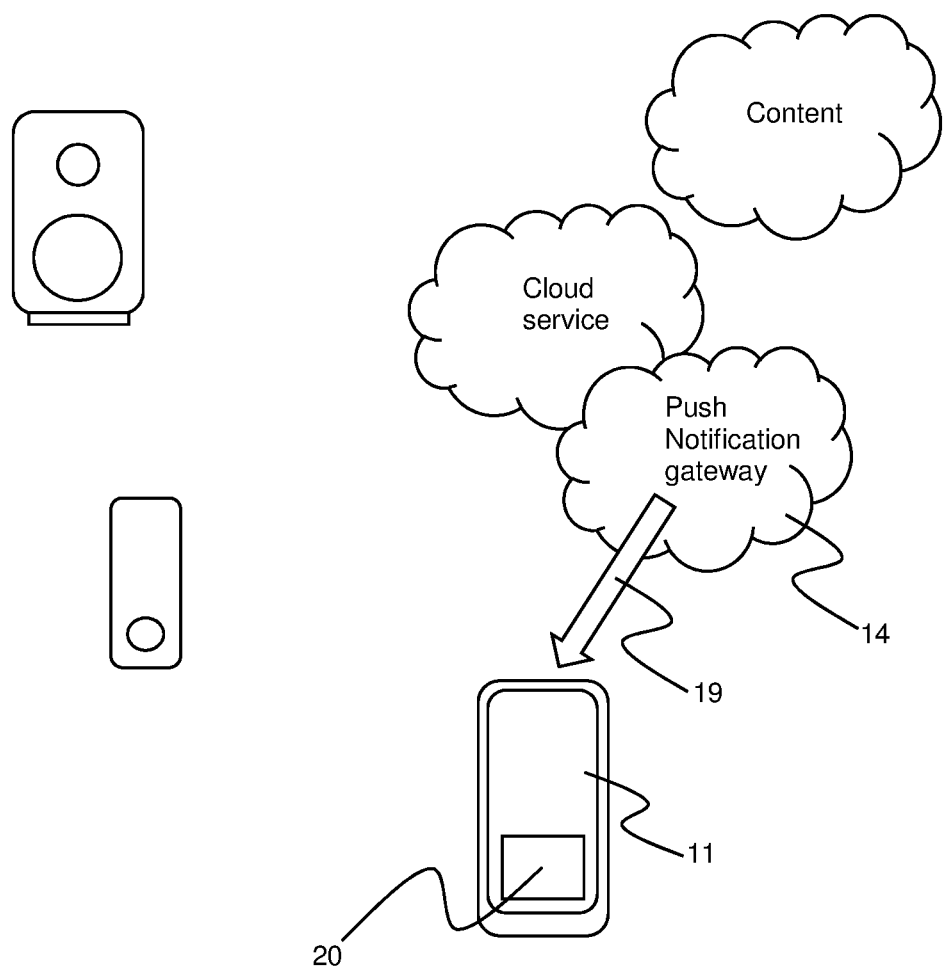
FIG. 8 shows the cloud service, via a push notification gateway, sending a "push notification" to the mobile device of the user, in which mobile device the content app is installed.

With reference to FIG. 8, the cloud service 12, via a push notification gateway 14, will send a "push notification" signal 19 to the mobile device 11 of the user, where the content app 20 is installed. Push notifications are provided by all currently available mobile operating systems (e.g. iOS and Android/Chrome). The push notification would trigger the content app 20 (even if it is a suspended mode), to execute a background task. The information provided to the content app 20 could include the CE-device 9 via which the trigger was received (e.g. serial number and local IP address).

With reference to FIG. 9, the content app 20 is performing its background execution, which could include a process of identifying what content needs to be played (e.g. should it be Internet Radio, or music from a music service, etc.)

Figure 10:
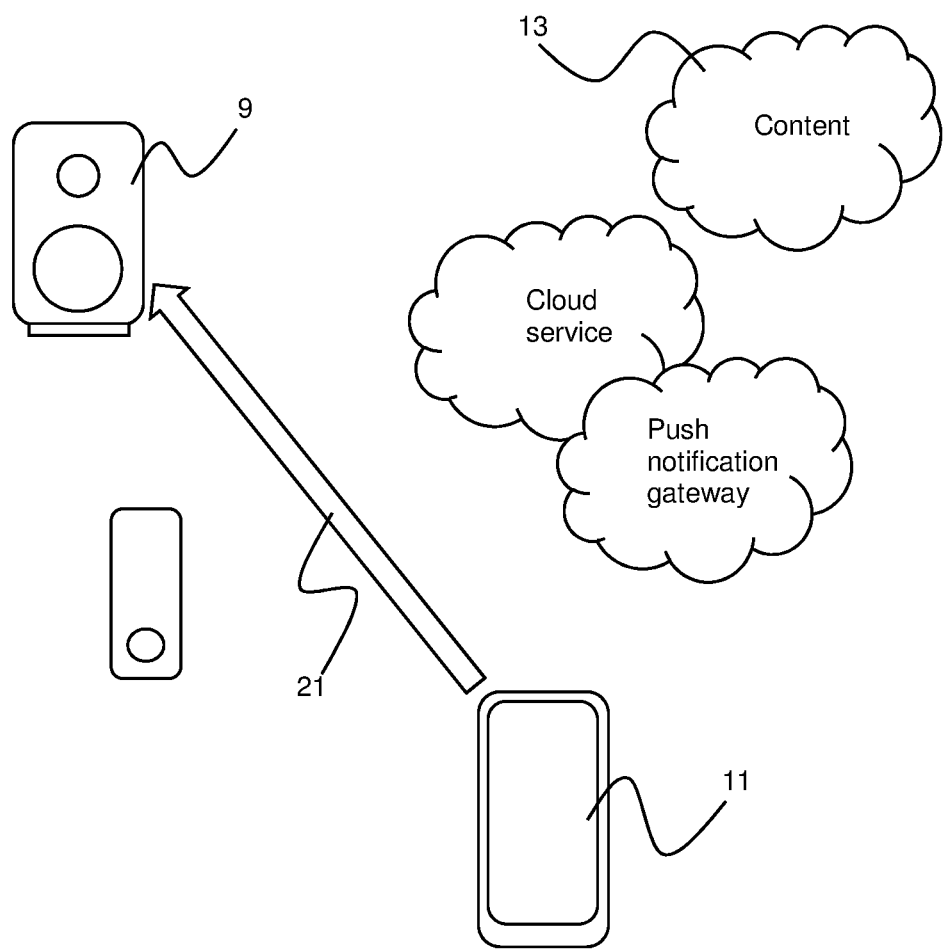
FIG. 10 shows the content app performing a standard streaming/casting experience to provide the content to the loudspeaker (based on serial number/IP address provided by the push notification)

With reference to FIG. 10, the content app 20 is performing a standard streaming/casting experience procedure needed to provide the content 13 to the CE-device 9 (based on serial number/IP address provided by the push notification) designated by a content identification signal sent from the mobile device 11 to the consumer electronics device 9 as indicated by arrow 21, i.e. the content app 20 passes the streaming/cast information to the CE-device 9 (e.g. URL that needs to be fetched and rendered, or the URL of the Google Cast "receiver app"). After this step the app 20 can suspend again in the background.

Figure 11:
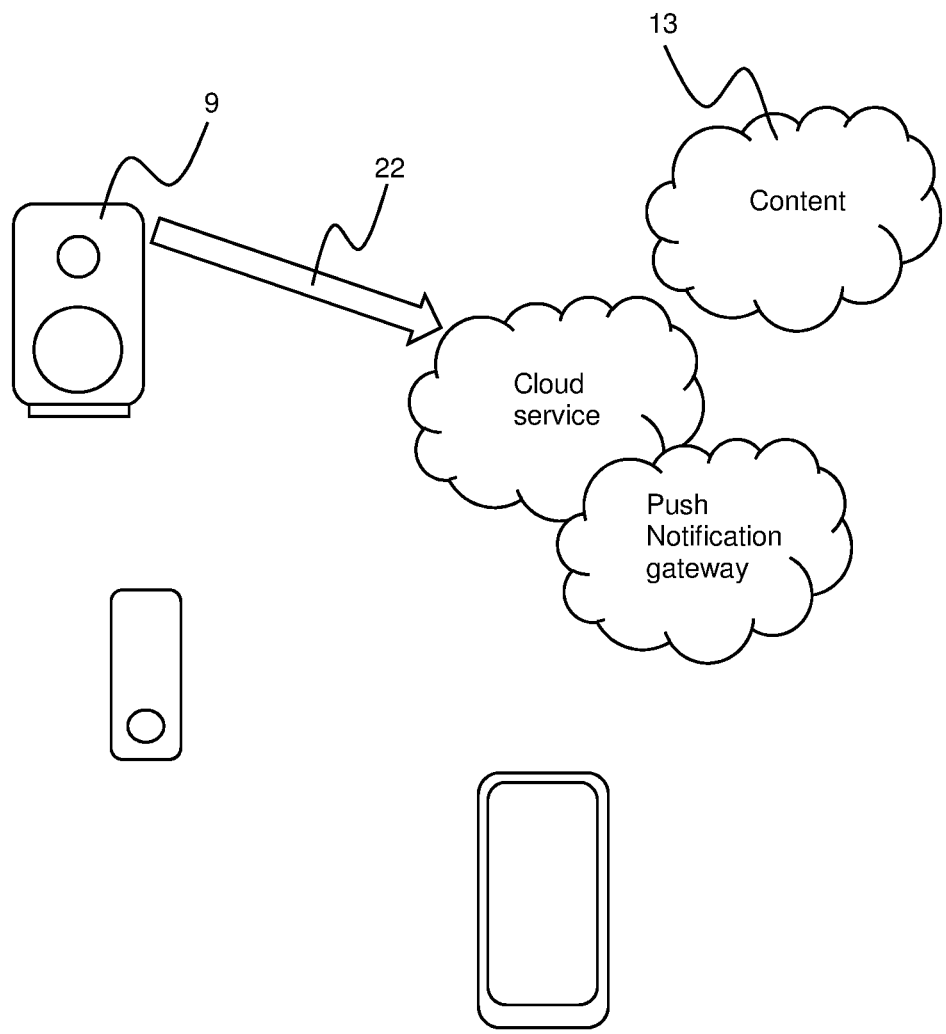
FIG. 11 shows that the loudspeaker is able to fetch the requested content directly from the cloud via the URL that was provided to it.

With reference to FIG. 11, the CE-device 9 can fetch the requested content 13 directly from the cloud, via the URL that was provided to it, by the content app 20, running on the mobile device 11. That URL (which points to the appropriate content at the cloud service 12), was generated by the content app 20, based on the contextual information (i.e. the trigger, location, date/time, etc)

Figure 12:
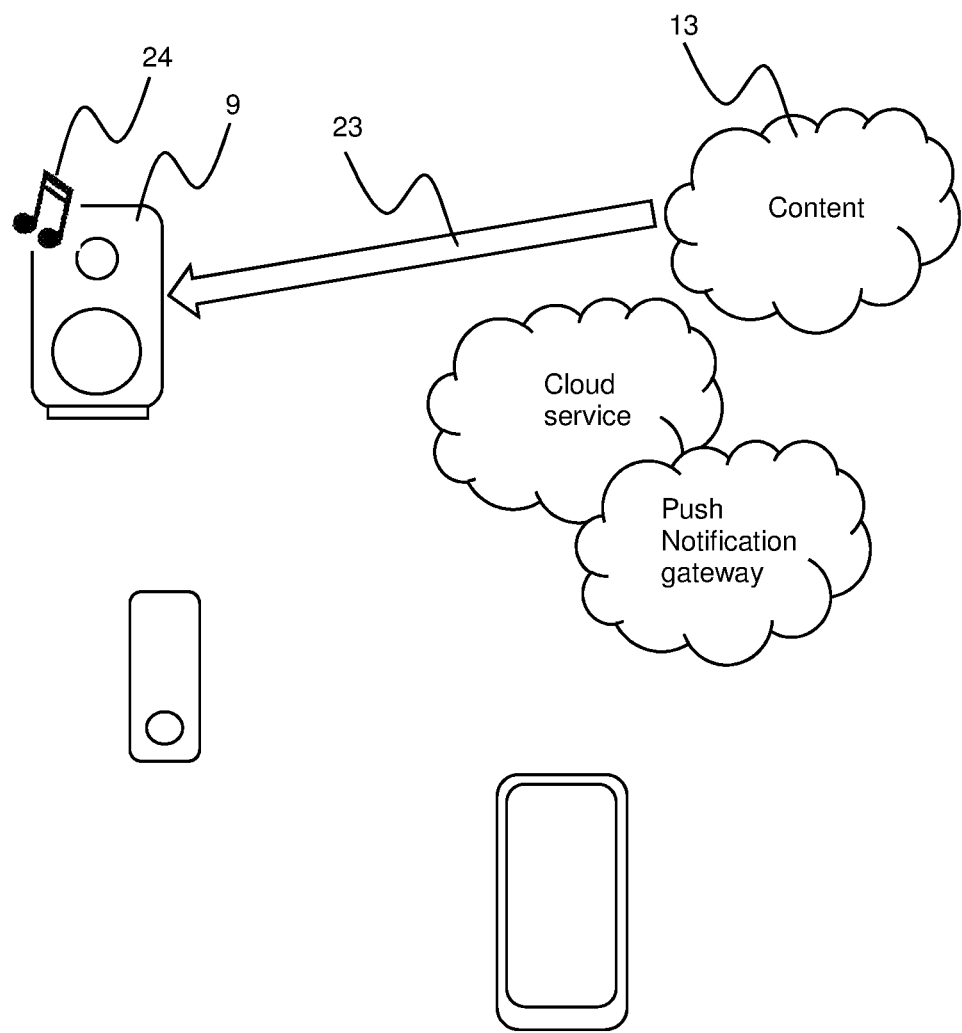
FIG. 12 shows that actual content streaming can start directly to the loudspeaker, which now plays the content as indicated in the figure.

With reference to FIG. 12, actual content streaming 23 can start directly to the CE-device 9. The CE device 9 now plays the content 13 as indicated at 24.

Figure 13:
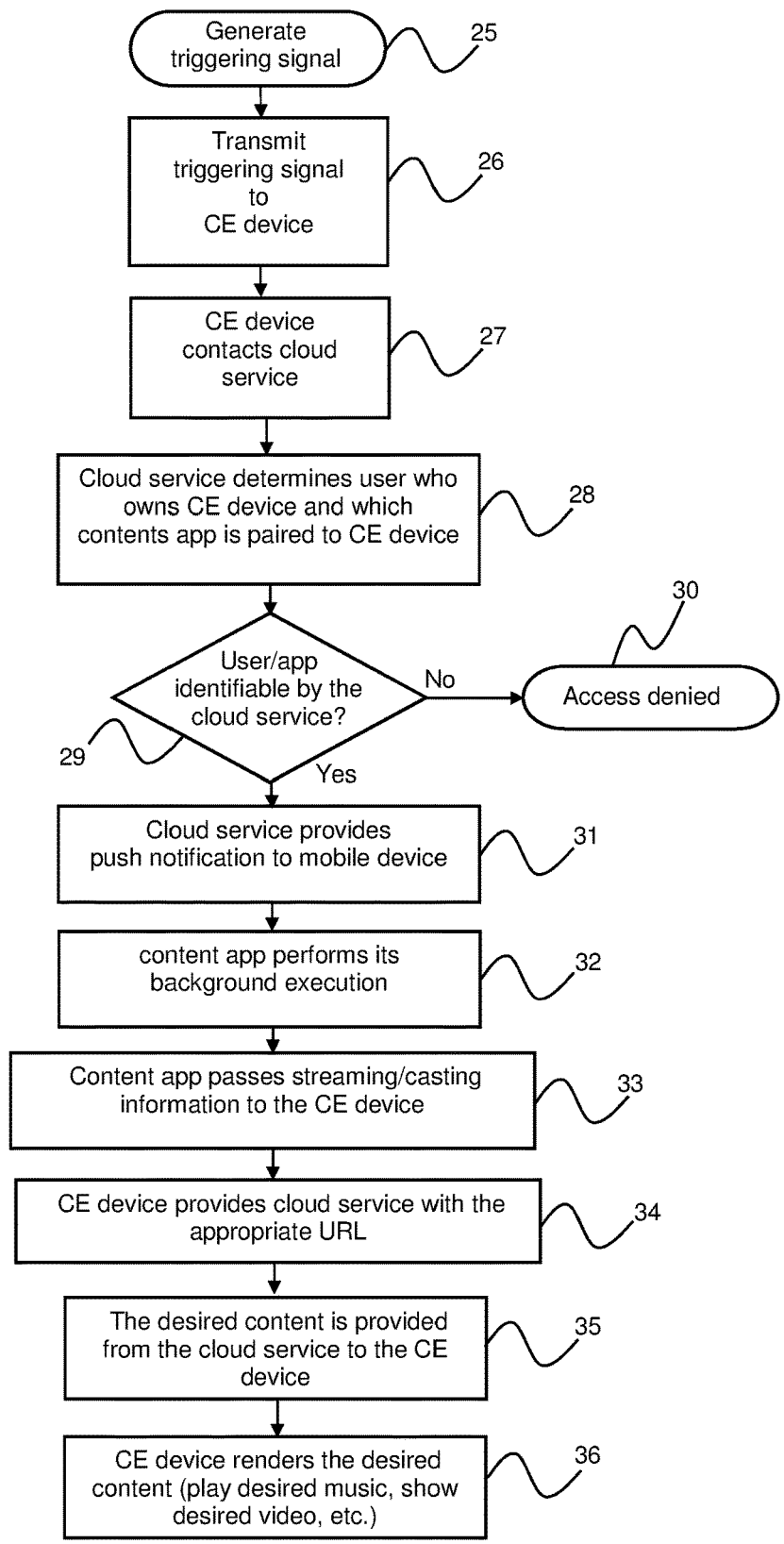
FIG. 13 shown a flow chart of an embodiment of the method according to the invention.

With reference to FIG. 13 there is shown a flow chart of an embodiment of the method according to the invention. In step 25 there is generated a triggering signal by means of a suitable triggering device. A triggering device could for instance be a remote control, but numerous alternative triggering devices are mentioned below. The triggering device is configured to transmit a triggering signal to a CE device, which signal can be recognized by the CE device as a triggering signal. This transmission takes place in step 26 in FIG. 13.

Upon reception of the triggering signal, the CE device in step 27 contacts the cloud service.

In step 28 the cloud service determines which user owns the CE device and which contents app is paired to this CE device.

In step 29 it is determined if the user and/or app can be identified by the cloud service and if this is not the case, the process ends at step 30. If the user and/or app can be identified by the cloud service, the process continues to step 31.

In step 31 the cloud service provides a push notification to the mobile device, which has the effect that the contents app in the mobile device in step 32 performs its background execution.

In step 32 the content app passes the streaming/casting information on to the CE device that has been identified in step 28, upon which the CE in step 33 provides the cloud service with the appropriate URL that corresponds to the specific content that is to be streamed/casted.

In step 35 the desired content is provided from the cloud service to the CE device, upon which the CE device in step 36 renders the content, i.e. for instance plays the desired music or shows the desired video over the CE device.

Although the present invention has been illustrated by means of specific embodiments hereof, it is understood that a person skilled in the art may conceive other embodiments and that all such embodiments will fall within the scope of the invention as defined by the claims.

Embodiments

1. A method for initiating streaming or casting experiences from one or more consumer electronics devices, the method comprising:
   providing one or more consumer electronics devices configured to be able to perform streaming or casting experiences upon reception of a command signal;
   providing a mobile communication device configured to receive a push notification signal from a cloud service and to transmit a content identification signal to said one or more consumer electronics devices upon reception of the push notification signal;
   providing a triggering device external to said mobile communication device and configured to provide said command signal when the triggering device is being activated;
   whereby said one or more consumer electronics devices will render said streaming or casting experiences upon activation of said triggering device 2. A method according to embodiment 1, wherein said triggering device provides said triggering signal directly to said one or more consumer electronics devices.

3. A method according to embodiment 1, wherein said mobile device is provided with a content app that is configured for receiving a push notification from a push notification gateway associated with said cloud service, such that said content app, upon reception of said push notification, performs a streaming/casting experience to provide said content to said consumer electronics device(s).

4. A method according to embodiment 1, wherein said triggering signal is generated in and transmitted from a remote control device.

5. A method according to embodiment 1, wherein said triggering device comprises at least one of the following group of triggering signal generating devices: a user actuated means such as a push button, a timer, a voice activation device, or a movement or proximity sensor device.

6. A method according to embodiment 1, wherein the triggering signal is not provided to the consumer electronics device, but directly to the mobile device and/or the content app directly.

7. A method according to embodiment 1, wherein said triggering is based on a Bluetooth low energy triggering signal.

8. A method according to embodiment 1 comprising providing the mobile device with a secondary app or dedicated push notification receiver in addition to the content app, which secondary app is configured to receive remove push notifications from the cloud service, wherein the secondary app upon reception of the push notification performs a streaming/casting experience to provide said content to said consumer electronics device(s).

9. A method according to embodiment 8, wherein said streaming/casting action is either initiated by said content app or by said secondary app depending on which of these apps has the capabilities and the permissions by the operating system and the streaming/casting SDK.

10. A method according to embodiment 1 comprising the provision of a plurality of consumer electronics devices, one of which devices is already rendering a streaming or casting experience, where the method comprises the step of, when receiving a new triggering signal at another of said plurality of consumer electronics devices, deciding how the reception of the new triggering signal which of said one or more consumer electronics devices should render the content associated with the new triggering signal.

11. A system for initiating streaming or casting experiences from one or more external triggers, the system comprising:
   one or more consumer electronics devices (9) configured to be able to perform streaming or casting experiences upon reception of a command signal (17);
   a mobile communication device (11) configured to receive a push notification signal (19) from a cloud service (12) and to transmit a content identification signal (21) to said one or more consumer electronics devices (9) upon reception of the push notification signal (19);
   a triggering device (10) provided external to said mobile communication device (11) and configured to provide said command signal (17) when the triggering device is being activated.
   whereby said one or more consumer electronics devices will render said streaming or casting experiences upon activation of said triggering device.

What is claimed is:

1. A system for streaming content, the system comprising a consumer electronics device, a mobile communication device, and a triggering device, wherein:
   the consumer electronics device is configured to receive a command signal from a triggering device, receive content identification instructions from the mobile communication device, and receive a streamed content signal from a network;
   the mobile communication device comprising a mobile application stored in computer storage, the mobile application comprising executable instructions that direct the mobile communications device to:
   receive push notification instructions from the network and
   in response to the mobile communication device receiving the push notification instructions from the network, to transmit the content identification instructions to the consumer electronics device; and
   the triggering device is configured to transmit the command signal to the consumer electronics device.

2. The system of claim 1 wherein the consumer electronics device is configured to transmit content request instructions to the network.

3. The system of claim 1 wherein the mobile communication device further comprises a second mobile application stored in computer storage, the second mobile application comprising executable instructions that direct the mobile communications device to receive the push notification instructions from the network and transmit the content identification instructions to the consumer electronics device, and wherein the mobile application and the second mobile application are configured to transmit the content identification instructions wherein authorization to transmit the content identification instructions is granted by the mobile communication device.

4. The system of claim 1 wherein the mobile communication device is configured to determine a user that is associated with the consumer electronics device.

5. The system of claim 1 wherein the content identification instructions comprises a Uniform Resource Locator.

6. The system of claim 1 further comprising a second triggering device configured to transmit a second command signal to a second consumer electronics device, wherein the mobile communication device is configured to determine which of the consumer electronics devices will provide content, wherein upon the transmission of the second command signal, the first consumer electronics device is providing content.

7. The system of claim 1 wherein the triggering device is a remote control device.

8. The system of claim 1 wherein the triggering device is selected from the group consisting of: a push button device, a timer device, a voice activation device, a movement sensor, or a proximity sensor.

9. The system of claim 1 wherein the triggering device is configured to transmit the command signal to the mobile communication device.

10. The system of claim 1 wherein the triggering device is configured to transmit the command signal via Bluetooth technology.

11. The system of claim 1 wherein in response to the consumer electronics device receiving content identification instructions from the mobile communication device, the consumer electronics device is configured to transmit content request instructions to the network.

12. A method for streaming content, the method comprising:
by a consumer electronics device: receiving a command signal from a triggering device, receiving content identification instructions from the mobile communication device, and receiving a streamed content signal from a network;
by execution of a mobile application on a mobile communication device:
receiving push notification instructions from a network and
in response to the mobile communication device receiving the push notification instructions from the network, transmitting the content identification instructions to the consumer electronics device; and
by a triggering device: transmitting the command signal to the consumer electronics device.

13. The method of claim 12 further comprising, by the consumer electronics device, transmitting content request instructions to the network.

14. The method of claim 12 further comprising, by execution of the second mobile application on the mobile communication device, receiving the push notification instructions from the network and transmitting the content identification instructions to the consumer electronics device, and by execution of the mobile application or the second mobile application, transmitting the content identification instructions wherein authorization to transmit the content identification instructions is granted by the mobile communication device.

15. The method of claim 12 further comprising, by the mobile communication device, determining a user that is associated with the consumer electronics device.

16. The method of claim 12 wherein the content identification instructions comprises a Uniform Resource Locator.

17. The method of claim 12 further comprising, by a second triggering device, transmitting a second command signal to a second consumer electronics device, and by the mobile communication device, determining which of the consumer electronics devices will provide content, wherein upon transmitting the second command signal, by the first consumer electronics device, providing content.

18. The method of claim 12 wherein the triggering device is a remote control device.

19. The method of claim 12 wherein the triggering device is selected from the group consisting of: a push button device, a timer device, a voice activation device, a movement sensor, or a proximity sensor.

20. The method of claim 12 further comprising, by the triggering device, transmitting the command signal to the mobile communication device.

21. The method of claim 12 further comprising, by the triggering device, transmitting the command signal via Bluetooth technology.

* * * * *